May 26, 1959 R. A. SEIDENSTRICKER 2,888,143
APPARATUS FOR RECOVERY OF NON-SOLUBLES FROM LIQUIDS
Filed Nov. 4, 1957 2 Sheets-Sheet 1
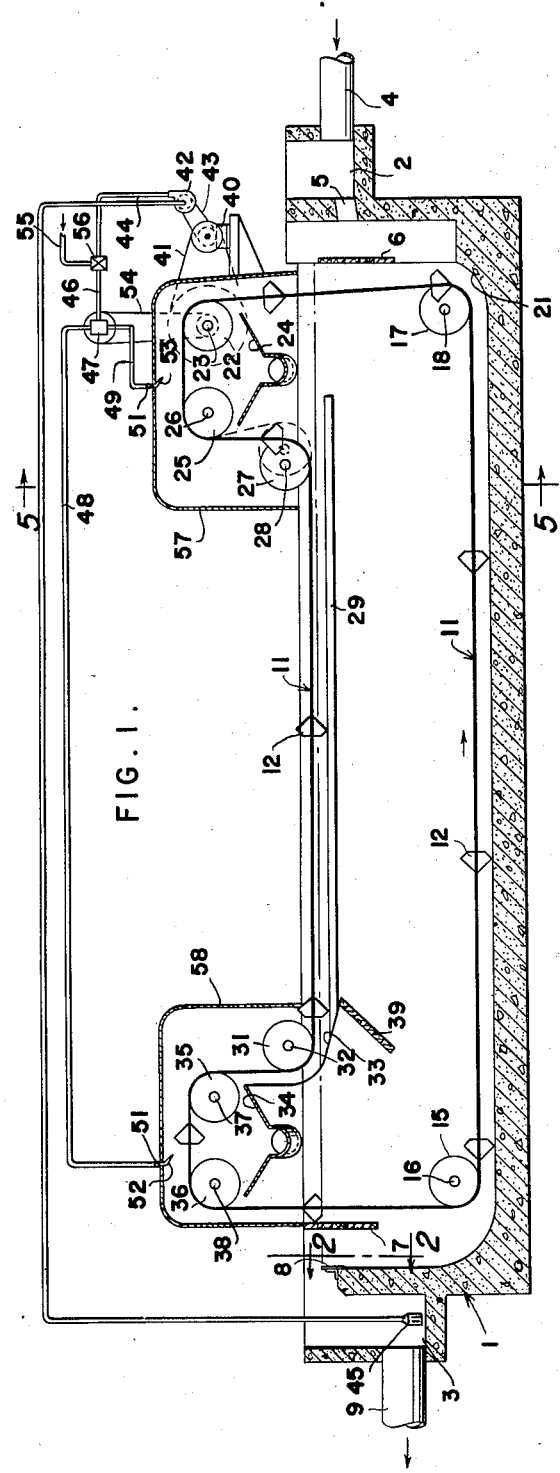
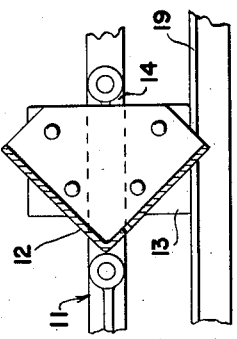
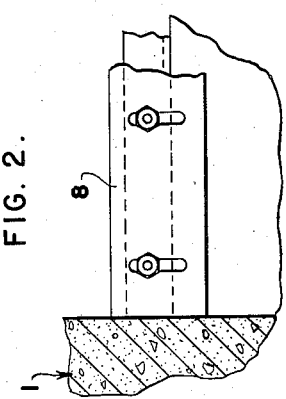
INVENTOR.
REGIS A. SEIDENSTRICKER
BY
ATTORNEY May 26, 1959 R. A. SEIDENSTRICKER 2,888,143
APPARATUS FOR RECOVERY OF NON-SOLUBLES FROM LIQUIDS
Filed Nov. 4, 1957 2 Sheets-Sheet 2

INVENTOR.
REGIS A. SEIDENSTRICKER
BY
*Ernst W. Schultz*
ATTORNEY

United States Patent Office 2,888,143
Patented May 26, 1959

2,888,143

APPARATUS FOR RECOVERY OF NON-SOLUBLES FROM LIQUIDS

Regis A. Seidenstricker, Milwaukee, Wis., assignor to Chain Belt Company, a corporation of Wisconsin Application November 4, 1957, Serial No. 694,164

5 Claims. (Cl. 210—525)

This invention relates to liquid separation apparatus having general application but has been developed particularly for the recovery of palm oil from the cooling water used in cold rolling of steel. The palm oil is added to the cooling water to lubricate the rolls for better rolling and to prevent the rolls from tearing away the surface of the plate. However, such lubrication of the rolls to reduce friction must be accomplished without promoting slippage of the rolls and the composition and consistency of the palm oil is therefore critical in the rolling operation. The use of palm oil is favored because of its low cost although its recovery for reuse is more difficult than that of a number of other lubricants which might otherwise be equally satisfactory. Palm oil includes both heavier and lighter constituents which require recovery by flotation and settling.

A principal object of the invention is to provide for the efficient recovery of the palm oil constituents for processing and reuse as required.

The present invention provides a single collecting means for the separate removal of the settled and floating constituents of the palm oil and also provides for the resubmergence of any floating constituents which might collect at the effluent end of the tank to allow recovery thereof by reflotation.

Another object of the present invention is to provide for the recovery of the several constituents of the palm oil in their original proportion so that the palm oil may be readily reconstituted for reuse.

Another object is to provide apparatus which is dependable in operation and does not require attention or periodic adjustment.

Another object is to provide for removal of the floating constituents with a minimum of water where desired.

Another object is to utilize the buckets of a single conveyor system to remove the settled constituents and the floating constituents as well as to provide for recirculation of the floating material which may accumulate at the effluent end of the tank for separation of any foreign matter therefrom and recovery of palm oil constituents associated therewith.

The drawings furnished herewith illustrate the best mode presently contemplated of carrying out the invention and as set forth hereinafter.

In the drawings:

Figure 1 is a longitudinal, vertical section of a tank having influent and effluent means and with the collector means and certain other parts thereof shown diagrammatically;

Fig. 2 is an enlarged section taken on line 2—2 of Figure 1 and showing the adjustable overflow weir plate;

Fig. 3 is a cross-section of one of the buckets of the collector means and showing a part of the chain and the shoe supporting the chain and end of the bucket on a rail;

Figure 4:
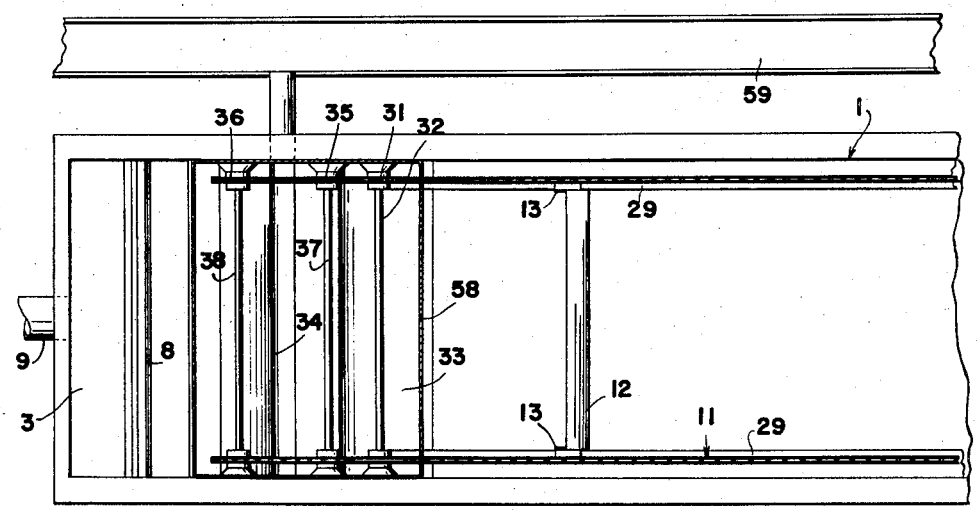
Fig. 4 is a plan view of the effluent end of the tank shown in Figure 1 with the housing and chain omitted to show the trough and plate for the recovery of the floating constituents of the palm oil.
Figure 5:
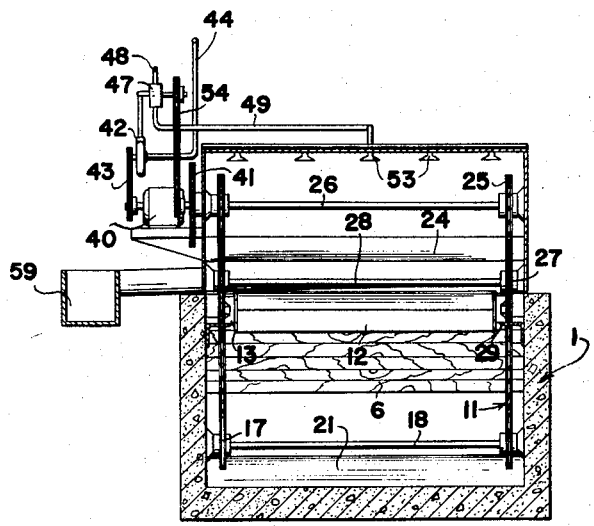
Fig. 5 is a section taken on line 5—5 of Figure 1 showing the drive for the bucket cleaning means in elevation.

The tank 1 as shown in the drawings is of concrete construction which includes the troughs 2 and 3 at opposite ends of the tank. The pipe 4 delivers the mixture of the used cooling water and palm oil into the trough 2 which opens into the tank through the series of openings 5 ahead of the baffle 6. Baffle 6 extends downwardly to about the central level of the tank so that the greater portion of the water flows beneath the baffle to enter the tank with a minimum of turbulence. A small amount of influent is allowed to flow over baffle 6 to prevent the accumulation of floating material between baffle 6 and openings 5. The clear effluent flows beneath baffle 7 and over the adjustable weir plate 8 into the trough 3 at the effluent end of tank 1 from which it is passed through pipe 9 for discharge or elsewhere for reuse.

As the water moves through the tank at a given maximum velocity, the fatty-acid, glyceride and other lighter palm-oil constituents rise to the surface of the water as skimmings and the heavier-than-water constituents or settlings collect on the bottom of the tank. The skimmings form a thick, semi-solid blanket which at low ambient temperatures is not readily removed from the surface of the water because of its solidity. The heavier-than-water constituents or settlings form an amorphous mass having a considerable viscosity and are heavily charged with mill dirt, oxides and other contaminants which must be removed in processing of the palm oil for reuse. The skimmings and settlings separately recovered may be either remixed and processed together to remove the contaminants or may be reprocessed separately.

The present invention is directed to the efficient removal of the skimmings and settlings for either manner of reprocessing and includes the pair of chains 11 which carry the series of buckets 12 therebetween. Each bucket 12 opens in the direction of travel of the chains and is supported at each end by a wearing shoe 13 which is fixed to corresponding links 14 of the respective chain 11.

The lower run of chains 11 extends along the bottom of tank 1 from the lower sprockets 15 carried by the shaft 16 at the effluent end of tank 1 to the corresponding lower sprockets 17 carried by shaft 18 at the influent end of tank 1. The chains 11 are supported by the shoes 13 on the rails 19 fixed within the tank so that the buckets 12 move directly along the bottom of tank 1 to push the settlings toward the inclined portion 21 of the floor of tank 1 formed at the influent end and extending below baffle 6.

The settlings fill buckets 12 as they move around the sprockets 17 and upwardly toward the drive sprockets 22 carried by the drive shaft 23 above the trough 24. After passing over sprockets 22 the buckets move horizontally toward the sprocket 25 carried by the shaft 26 and during that time are turned to dump into trough 24. Some of the material will discharge by gravity into trough 24 and the remainder must be removed mechanically or hydraulically, as will be described hereinafter.

The emptied buckets 12 are carried downwardly by chains 11 from sprockets 25 and pass below the take-up sprockets 27 carried by the shaft 28 which is horizontally adjustable to take up the wear in chains 11. Chains 11 after leaving sprockets 27 are supported by shoes 13 on the rails 29 fixed to the side walls of tank 1 at the approximate water level within the tank. Rails 29 extend substantially the length of the tank from a point below sprockets 27 (adjusted for maximum take up) to a point below the corresponding sprockets 31 carried by shaft 32. In the operation of buckets 12 on rails 29, the skimmings are pushed toward the effluent end of tank 1. The palm oil skimmings in the form of a soft-semi-solid blanket tends to stay or move in a uniform mass onto the curved, sheet-metal plate 33 having a lower, forward edge disposed beneath the water level and extending the full width of tank 1. Plate 33 is inclined beneath sprockets 31 to form a ramp or "beach" for the skimmings and curves upwardly behind sprockets 31 and extends vertically to the rim of the trough 34. The buckets 12 fill with the skimmings pushed onto plate 33 as the buckets move around sprockets 31 and upwardly toward the sprockets 35 above trough 34. The buckets move horizontally from sprockets 35 to sprockets 36 during which time they are turned to dump into trough 34. Some of the skimmings will discharge by gravity into trough 34 and the remainder must also be removed by other means as will be described.

Trough 34 for receiving the skimmings is located above tank 1 near the effluent end thereof and below the aligned pairs of sprockets 35 and 36 carried by the parallel shafts 37 and 38, respectively. The chains 11 carry buckets 12 downwardly from sprockets 36 in an inverted position into the water past baffle 7 and toward sprockets 15.

The palm-oil constituents which do not reach the surface of the water ahead of plate 33 but would pass beneath the plate are intercepted by the inclined baffle 39 extending a limited distance down from the forward edge of plate 33. Baffle 39 should be sufficiently near vertical so that the constituents do not collect on the plate but so that they will move upwardly to the surface and be collected by the buckets 12 with the skimmings pushed forward by the buckets.

Chains 11 with buckets 12 are driven by the motor 40 operatively connected to drive shaft 23 by the chain drive 41. Motor 40 also operates the pump 42 by means of the chain drive 43. One end of the supply pipe 44 is connected to the inlet of pump 42 and the other end of pipe 44 is fitted with the strainer 45 disposed in trough 3 to provide a suitable supply of water to the pump. The water from pump 42 is delivered through pipe 46 to the distributor valve 47 which is connected by the separate lines 48 and 49 to the headers 51 fitted with nozzles 52 and 53, respectively.

Nozzles 52 and 53 are disposed to direct the water into buckets 12 moving over troughs 24 and 34 and to wash the settlings and skimmings remaining in the buckets into the respective troughs.

To reduce the necessary capacity of the pump 42 and the water accompanying the palm-oil recovered, where desired, buckets 12 are spaced so that different buckets pass alternately over troughs 24 and 34, while valve 47 controls the delivery of water by pump 42 to the corresponding nozzles 52 and 53, alternately. At the same time, valve 47 alternately connects lines 48 and 49 with pipe 46 and is operated by the chain drive means 54 in timed relation to rotation of shaft 26 and the travel of the corresponding buckets 12.

In the operation of the unit, the used cooling water entering tank 1 passes baffle 6 and travels at a uniform, low rate of flow through tank 1 to allow the settling and flotation of the separate palm-oil constituents. The heavier than water constituents or settlings are recovered as they accumulate on the floor of tank 1 and are conveyed to trough 24 by buckets 12. The lighter-than-water constituents or skimmings reaching the surface of the water are pushed by buckets 12 traveling on rails 29 toward plate 33. The skimmings are pushed onto plate 33 and as the buckets move around sprockets 31 and upwardly therefrom, they are filled by the skimmings and the excess pushed ahead of the buckets remains or may fall back to the lower part of plate 33.

As each bucket 12 passes over and is turned to dump into trough 34, water from pump 42 is delivered to nozzles 53 under pressure and cleans the bucket of the skimmings therein. The emptied bucket then travels over sprockets 35 and is inverted as it moves downwardly into the water and past baffle 7. The skimmings which may pass beneath baffle 39 and rise out of the effluent tend to accumulate immediately in front of baffle 7 beneath trough 34. The skimmings so disposed in the path of the buckets 12 re-entering the tank are carried back into the tank by the buckets which are vented as shown to allow escape of trapped air and the entry of the skimmings into the buckets so that they are carried past the effluent flowing beneath baffle 7. As the settlings fill the buckets passing along the bottom of tank 1, the skimmings are displaced upwardly in the bucket. Such skimmings are thereupon either washed back into the flow and recovered as such, or may be collected in trough 24 with the settlings as described. It will be noted that buckets 12 with the settlings pass through the influent flowing beneath baffle 6 and that some washing may occur, although such washing should not be considerable. However, whatever material is washed out of the buckets will be principally the skimmings which are thus recirculated and then recovered. The recovery of the skimmings at the effluent end of the tank provides for the recovery of all the skimmings and the most efficient operation of tank 1 for its given size.

Baffles 7 and 39 comprise a series of boards or plates for removal or the addition of one or more thereof so that the depth of either baffle may be adjusted to recover the maximum skimmings corresponding to the settlings recovered.

The collector means is automatic in operation and provides the uniform recovery of both the settlings and skimmings separating out of the fluid passing through the tank at any given rate.

The viscosity of the palm-oil constituents and their recovery are very subject to temperature changes generally due to daily or seasonal variations in temperature particularly if the used cooling water must be stored out-of-doors any length of time before the palm oil can be recovered therefrom.

To illustrate, the following palm oil specifications are typical of that used for lubrication in cold-rolling of steel:

| | |
|---|---|
| Specific gravity | 0.914–0.918 |
| Saponification value | 195–205 |
| Viscosity, S.U.S. @ 130° F. | 114–120 |
| Viscosity, S.U.S. @ 210° F. | 53–55 |
| Melting point, °F. | 77–122 |
| Free fatty acid, percent | 7–17 |

Accordingly, the present invention also contemplates the use of steam as well as or instead of water for removing the settlings and skimmings from buckets 12. For that purpose, the steam line 55 is connected to pipe 42 by the valve 56 which is diagrammatically shown. Valve 56 is operative to close line 46 as to the pump 42 and to provide for the delivery of steam from line 55 to distributor valve 47. The covers 57 and 58 supported by the sides of tank 1 enclose troughs 24 and 34 to prevent water from splashing outside of the tank. When steam is used to clean the buckets such splashing must also be prevented for protection of persons near-by. Covers 57 and 58 further extend, as shown, to just above the water-line of the tank to form steam-chambers in which the contents of the buckets are heated to lower their viscosity so that such contents are discharged more readily into troughs 24 and 34 and also so that they will flow more readily from troughs 24 and 34 into the collecting trough 59 disposed alongside tank 1.

Only one drive means is required for the collection of the settlings and skimmings and the collector means is readily installed in existing tanks and adjusted for the desired operation and recovery of materials heavier and lighter than water.

Various modes of carrying out the invention are contemplated as being within the scope of the following claims particularly pointing out and distinctly claiming the subject matter which is regarded as the invention.

I claim:

1. Apparatus for recovery of the separable constituents of semi-liquids which are respectively heavier and lighter than the water from which they are to be recovered, comprising a tank having influent and effluent ends, separate troughs located above said tank near the influent and effluent ends of the tank and to receive respectively said heavier and lighter constituents, a part of said tank at the influent end thereof having a lower curved portion merging with the bottom of the tank, a plate forming a beach near the effluent end of the tank and having a rear curved portion extending vertically to the trough for the lighter constituents, collector means including a series of buckets having a lower run extending along the bottom of the tank toward said part thereof and having a vertical run adjacent thereto and extending from the tank over said first trough, said collector means having a return run extending horizontally toward said plate and extending upwardly adjacent to said plate and over said second trough, said collector means having a downward run from said second trough passing the effluent end of the tank to said lower run, said buckets extending the width of the tank to push the settled heavier constituents against said tank part and being disposed to lift said constituents and to empty into said first trough, said emptied buckets on said return run being disposed to push the floating lighter constituents against and up said plate and out of the water and to lift the constituents over said second trough and to empty into said second trough, and a baffle extending downwardly from said plate and toward the effluent end of the tank serving to prevent the discharge of the lighter constituents reaching the baffle.

2. Apparatus for recovery of the separable constituents of semi-liquids which are respectively heavier and lighter than the water from which they are to be recovered, comprising a tank having influent and effluent ends, separate troughs located above said tank near the influent and effluent ends of the tank and to receive respectively said heavier and lighter constituents, a part of said tank at the influent end thereof having a lower curved portion merging with the bottom of the tank, a plate forming a beach near the effluent end of the tank and having a rear curved portion extending vertically from the tank to said trough for the lighter constituents, collector means including a series of buckets having a lower run extending along the bottom of the tank toward said part thereof and having a vertical run adjacent thereto and extending from the tank over said first trough, said collector means having a return run extending horizontally toward said plate and extending upwardly adjacent to said plate and over said second trough, said collector means having a downward run from said second trough passing the effluent end of the tank to said lower run, said buckets extending the width of the tank to push the settled heavier constituents against said tank part and being disposed to lift said constituents and to empty into said first trough, said emptied buckets on said return run being disposed to push the floating lighter constituents against and up said plate and out of the water and to lift the constituents over said second trough and to empty into said second trough, and a baffle extending downwardly from said plate and toward the effluent end of the tank serving to prevent the discharge of the lighter constituents reaching the baffle, said buckets being inverted on the downward run to carry back into the tank any floating constituents having passed beneath said baffle and accumulating at the effluent end of the tank behind said baffle.

3. Apparatus for recovery of the separable constituents of semi-liquids which are respectively heavier and lighter than the water from which they are to be recovered, comprising a tank having influent and effluent ends, separate troughs located above said tank near the influent and effluent ends of the tank and to receive respectively said heavier and lighter constituents, a part of said tank at the influent end thereof having a lower curved portion merging with the bottom of the tank, a plate forming a beach near the effluent end of the tank and having a rear curved portion extending from the tank and up to said trough for the lighter constituents, and collector means including a series of buckets having a lower run extending along the bottom of the tank toward said part thereof and having a vertical run adjacent thereto and extending from the tank over said first trough, said collector means having a return run extending horizontally toward said plate and extending upwardly adjacent to said plate and over said second trough, said collector means having a downward run from said second trough passing the effluent end of the tank to said lower run, said buckets extending the width of the tank to push the settled heavier constituents against said tank part and being open to empty into said first trough, said emptied buckets on said return run serving to push the floating lighter constituents against and up said plate and out of the water and being disposed to fill with and lift the constituents over said second trough and to empty into said second trough, said buckets being inverted on the downward run to carry back into the tank the floating constituents accumulating at the effluent end of the tank behind said plate.

4. Apparatus for recovering non-soluble fats and oils having separable constituents which are respectively heavier and lighter than water from which they are to be recovered, comprising a tank having a submerged opening extending across the tank for the introduction of influent to one end and means for withdrawal of effluent from the opposite end of the tank including an overflow weir disposed to establish a given water level for the tank, collector means including parallel strands of chain and a series of buckets connected to and extending between the chains, a trough located above the tank and at the influent end thereof to receive the heavier constituents, a second trough located above the tank at the effluent end thereof to receive the lighter constituents, said collector means being disposed to operate along the bottom of the tank and over said first trough and along the water level of the tank and over said second trough, the upward run of said collector means from the bottom of the tank to said first trough being disposed adjacent to said submerged opening to allow any of the floatable constituents to be washed from the top of the bucket before reaching said first trough, and fluid discharge devices fixed above said troughs and disposed to direct fluid into each bucket as it passes over the respective trough to wash the bucket of its contents into said trough.

5. Apparatus for recovering non-soluble solids or semi-solids having separable constituents which are respectively heavier and lighter than water from which they are to be recovered, comprising a tank having a submerged opening extending across the tank for the introduction of influent to one end and a submerged opening for withdrawal of effluent from the opposite end of the tank, said tank having overflow means associated with said last named opening and disposed to establish a given water level for the tank, collector means including buckets extending substantially the width of the tank and chain means connecting the same in series, a trough located above the tank and at the influent end thereof to receive the heavier constituents, a second trough located above the tank at the effluent end thereof to receive the lighter constituents, said collector means being disposed to move said bucket along the bottom of the tank and over for emptying into said first trough, the upward run of said collector means from the bottom to said first trough being disposed adjacent to said submerged opening to allow any of the floatable constituents to be washed from the top of the bucket before reaching said trough, and said collector means being disposed to move said buckets along the water level of the tank and over for emptying into said second trough, and means associated with each of said troughs to remove the contents from each bucket as it passes over the respective trough and to empty into said trough.

References Cited in the file of this patent

UNITED STATES PATENTS

| | | |
|---|---|---|
| 1,290,516 | Conklin | Jan. 7, 1919 |
| 1,294,519 | Moxham | Feb. 18, 1919 |
| 1,839,117 | Nagelvoort | Dec. 29, 1931 |
| 2,359,414 | Frova | Oct. 3, 1944 |